(12) United States Patent
Chandler et al.

(10) Patent No.: US 6,201,218 B1
(45) Date of Patent: *Mar. 13, 2001

(54) FOOD COOKING APPARATUS WITH REMOVABLE CONVEYOR ASSEMBLY AND SERPENTINE HEATER PROVIDING NON-UNIFORM HEATING

(75) Inventors: Neal Chandler, Shreveport; Lamont Lackman, Keithville, both of LA (US)

(73) Assignee: The Frymaster Corporation, Shrevport, LA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/168,418

(22) Filed: Oct. 8, 1998

(51) Int. Cl.[7] .................................................. A47J 37/00
(52) U.S. Cl. ......................... 219/388; 99/386; 99/443 C; 198/626.5; 198/861.1; 198/860.5; 198/586
(58) Field of Search ........................ 219/388; 198/626.1, 198/626.5, 626.6, 836.2, 814, 861.1, 861.2, 861.3, 860.5, 586, 587, 592; 392/432–435; 156/583.4; 99/386, 387, 443 C (56) References Cited

U.S. PATENT DOCUMENTS

| | | | |
|---|---|---|---|
| 2,025,586 | * 12/1935 | Hall | 392/432 |
| 2,151,790 | * 3/1939 | Mitchell | 99/386 |
| 2,172,194 | * 9/1939 | Ehrgott | 99/386 |
| 3,517,605 | * 6/1970 | Hursch et al. | 99/386 |
| 3,646,880 | 3/1972 | Norris . | |
| 4,404,898 | * 9/1983 | Chaudoir | 99/331 |
| 4,488,480 | * 12/1984 | Miller et al. | 99/386 |
| 4,530,276 | 7/1985 | Miller . | |
| 4,567,819 | 2/1986 | Adamson . | |
| 4,924,767 | * 5/1990 | Stuck | 99/423 |
| 5,473,975 | * 12/1995 | Bruno et al. | 99/335 |
| 5,588,354 | * 12/1996 | Stuck et al. | 99/386 |
| 5,673,610 | 10/1997 | Stuck . | |

FOREIGN PATENT DOCUMENTS

| | | | |
|---|---|---|---|
| 44236/93 | * 3/1994 | (AU) | 99/443 C |
| 2616289 | * 6/1987 | (FR) | 392/435 |
| 2616891 | * 12/1988 | (FR) . | |
| 579200 | * 7/1946 | (GB) | 99/386 |

* cited by examiner

Primary Examiner—John A. Jeffery
(74) Attorney, Agent, or Firm—Ohlandt, Greeley, Ruggiero & Perle, LLP (57) ABSTRACT

Food cooking apparatus comprises two conveyor belts, one of which is heated by a platen to provide a moving cooking surface. Since both belts are movable, they are operable to grip a bun heel or crown and convey it along a cooking path between the two belts without disfigurement of the bun. Also disclosed is a quick connect/disconnect feature that allows quick removal of one of the assemblies for cleaning, maintenance and/or belt replacement. This feature has a bracket member which when released allows the removable assembly to slidably disengage from the frame of the apparatus. The food cooking apparatus includes an electrical heating platen with a coil wound in a serpentine manner and spatially distributed to produce high temperature cooking in the early stage of cooking and lower temperature cooking in the later stages of cooking. The food cooking apparatus also includes a mechanism that responds to manual pushing of the idler roller to shift the idler shaft between a drive position and a belt slack position that allows easy and quick installation or removal of the endless belt.

16 Claims, 6 Drawing Sheets

FOOD COOKING APPARATUS WITH REMOVABLE CONVEYOR ASSEMBLY AND SERPENTINE HEATER PROVIDING NON-UNIFORM HEATING

FIELD OF INVENTION

This invention relates to a food cooking apparatus and, more particularly to a food cooking apparatus that uses a conveyor to convey food products along a cooking path.

BACKGROUND OF INVENTION

Contact cooking, often referred to as "toasting" or "grilling", of food products such as dough products, for example breads, rolls, bagels, muffins and buns (hereinafter collectively referred to as "buns"), is known in the commercial food industry. It usually involves compressing one or both pieces of a sliced bun, cut surface down in contact with a surface heated at a high temperature for a time sufficient to heat the interior of the bun to from about 150° F. to about 170° F. This is done to dry and carmelize the cut surface(s) of the bun. Carmelization is desired because it provides a visually appealing, at least partially bonded surface texture which crunches when bitten. The bonded surface also seals the cut surface which prevents juices from the food and moisture from condiments from entering the interior of the bun and rendering it soggy.

Conveyorized food cooking apparatus is useful to cook a variety of food products including buns, hamburger patties, and the like. Conveyorized cookers have used either a single conveyor or two or more conveyors to convey food products along a cooking path which is heated by a heater. Single conveyor cookers generally have a stationary heated platen disposed along a cooking path. A conveyor belt is disposed spaced apart from the platen by an amount that allows a food product to be engaged by the conveyor belt and conveyed along the cooking path in engagement with the platen. Typically, different halves of a bun have different widths and require different belt to platen separations or gaps. U.S. Pat. Nos. 4,530,276 and 5,673,610 disclose contact toasters of this type that have a pair of toasting chambers separated by a centrally disposed platen to define separate cooking paths in each chamber. One of the chambers has its cooking path height set to toast the heel half of a bun and the other chamber has its cooking path width set to toast the crown half.

The conveyor belt is operable to engage the bun at a food product inlet and convey it under pressure slidingly along the surface of the stationary platen. The leading edge of a bun tends to roll or fold under as it is dragged by the belt across the stationary platen surface. This results in the bun becoming mangled or disfigured. In addition, a rolled under bun does not stay in complete contact with the platen, thereby resulting in uneven carmelization. Moreover, incomplete bread to platen contact results in poor heat transfer so the bun temperature is lower so as to affect the carmelization process.

Two conveyor belt cookers generally employ two spaced apart conveyor belts to form a separation gap along the cooking path. The moving belts engage or grip the food products on opposite sides which tends to avoid the disfigurement of the food products. U.S. Pat. No. 3,646,880 discloses a food cooker of this type. The belts are endless with good heat transfer properties. Separate heaters are disposed within the endless belts along the cooking path for two sided cooking.

A technique of controlling temperature is provided so that the food product is cooked at high temperature as it enters the cooking path and at lower temperature as it progresses toward the exit of the path. This is accomplished by providing for each conveyor belt first and second heating platens end to end along the cooking path to define first and second heating zones along the cooking path. As the food product travels along the cooking path, it passes through the first zone and then the second zone. The two heating zones are controlled to apply heat of greater intensity and temperature in the first zone in the early stages of cooking and heat of lower intensity and temperature in the second zone as the food products become partially cooked. This technique is expensive as it requires two separate heaters for each conveyor belt.

Conveyorized food cookers generally include a base and two upright frame walls to which the conveyor belt assemblies and/or platens are mounted. This type of construction generally requires numerous parts that involve high cost of parts and labor to assemble. In addition, the use of two frame walls prevents easy access to the conveyor belt assemblies for cleaning and maintenance. As a result, the belts and/or platen are cleaned or maintained in situ with some difficulty because of limited access to the surfaces. Some food cookers have employed endless belts with seams that can be unfastened for removal and then refastened for reinstallation. Removal is difficult and takes considerable time, resulting in considerable down time.

It is a main objective of the present invention to overcome the above and other limitations and disadvantages of conventional food cooking devices.

An object of the present invention is to provide an improved electrical heating platen for a food cooking apparatus.

Another object of the present invention is to provide an improved food cooking apparatus that achieves variable heat intensity and temperature cooking with a single platen.

Still another object of the invention is to provide a food cooking apparatus that is easy to assemble.

Yet another object of the present invention is to provide an improved food cooking apparatus that permits easy removal and installation of conveyor belts at the factory or in the field.

A further object of the present invention is to provide a food cooking apparatus having at least one conveyor belt assembly that is easily and quickly removable for cleaning and/or maintenance purposes.

SUMMARY OF INVENTION

The food cooking apparatus according to the present invention includes a conveyor belt assembly that has an endless belt that is movable to convey food products along a cooking path from a food product inlet to a food product outlet. An electrical heating means is provided to heat the food products with a temperature that decreases along the cooking path. The electrical heater has a body with a heating surface defined by first and second generally parallel edges. An electrical heating element having a continuous heating coil wound in a serpentine manner is disposed in heating relationship to the heating surface. The coil is spatially distributed in a manner whereby, when connected to electrical energy, the temperature of the heating surface is higher near the first edge and lower near the second edge. Whereby the cooking temperature decreases as the food product travels along the cooking path from the food product inlet to the food product outlet. In a preferred embodiment, the distance between adjacent coil segments is smaller near the inlet and larger near the outlet.

An electrical heating platen according to the invention has a body with a heating surface defined by first and second generally parallel edges. An electrical heating element having a continuous heating coil wound in a serpentine manner is disposed in heating relationship to the heating surface. The coil is spatially distributed in a manner whereby, when connected to electrical energy, the temperature of the heating surface is higher near the first edge and lower near the second edge. In a preferred embodiment, the distance between adjacent coil segments is smaller near the first edge and larger near the second edge.

In another embodiment, the food cooking apparatus according to the invention has a conveyor belt assembly mounted to a frame. The conveyor belt assembly includes a drive roller, an idler roller and an endless belt. The assembly has a first position in which the endless belt engages the drive roller and the idler roller and driving motion is transmitted from the drive roller to the endless belt. The assembly has a second position in which the endless belt is easily installed or removed from the assembly.

The conveyor belt assembly includes first and second wall members to which the idler roller is mounted in a manner to place the conveyor belt assembly in the first and second positions. First and second slots are provided in the first and second wall members. Each of the slots has first and second retaining positions corresponding to the first and second conveyor belt positions. The shaft of the idler roller is disposed in the slots and is movable by an idler shift means between the first and second retaining positions.

In still another embodiment, the food cooking apparatus according to the invention includes a base and a frame wall extending from the base. A conveyor belt assembly has a first side wall and a second side wall. The first side wall is attached to the frame wall. A support bracket is disposed between the base and the second side wall and is removably coupled to the second side wall. Preferably, the support bracket is fastened to the second side wall by a releasable fastener. In one embodiment, the support bracket, when released, is removable. In another embodiment, the support bracket, when released, pivots away from the second side wall. In both of these embodiments, access is quickly gained to the conveyor belt assembly for maintenance or cleaning purposes.

The present invention further provides yet other embodiments that have at least one conveyor belt assembly that is easily and quickly removable for cleaning purposes. In these embodiments, the conveyor belt assembly is releasably coupled to the frame of the apparatus. The conveyor belt assembly, when coupled, is operable together with a cooking surface in the cooking of food products and, when uncoupled, is removable for cleaning and/or maintenance purposes. The releasable coupling means includes a bracket member that releasably couples the at least one conveyor belt assembly to the frame with a quick connect/disconnect fastener means. The first conveyor belt assembly further includes a shaft having an end that extends toward the frame for mating in a releasable manner with a rotatable drive element mounted in the frame. When removed, the cooking surface is readily accessible for cleaning and/or maintenance.

Other and further objects, advantages and features of the present invention will be understood by reference to the following specification in conjunction with the accompanying drawings, in which like reference characters denote like elements of structure.

DESCRIPTION OF PREFERRED EMBODIMENTS

With reference to FIGS. 1 through 5, there is provided a food cooking apparatus generally represented by numeral 20. Food cooking apparatus 20 has a base 22 and a frame wall 23 extending from base 22 in the vertical direction for FIGS. 1 through 5. Food cooking apparatus also may have a housing which is removed and not shown in FIGS. 1 through 5.

Figure 4:
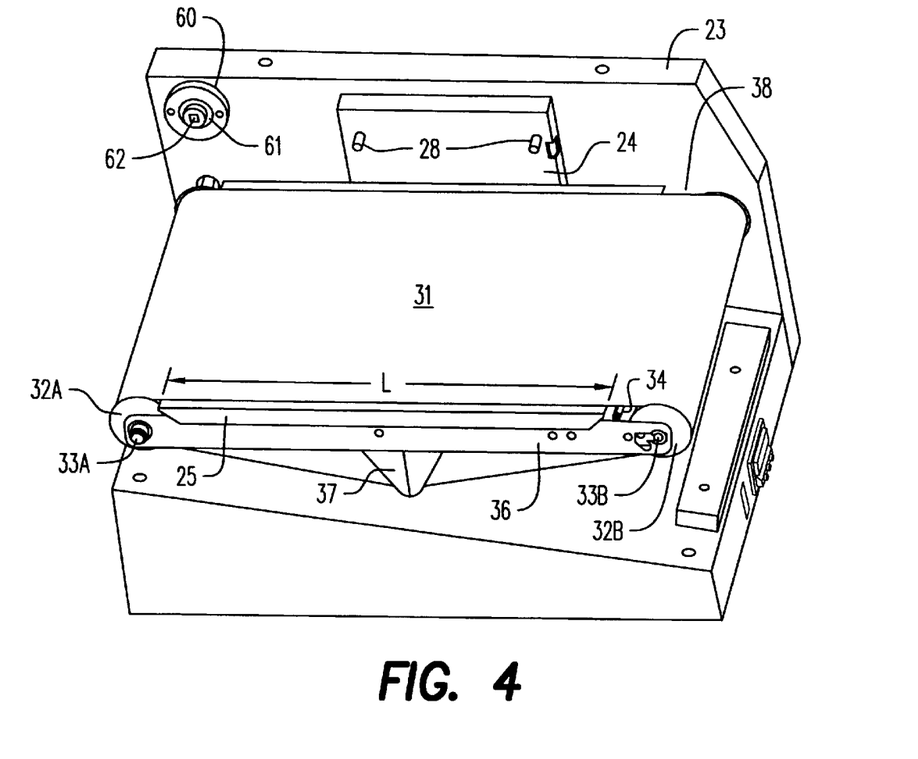
FIG. 4 is another perspective view of FIG. 1 with the upper conveyor belt assembly removed.

There is provided a first conveyor belt assembly 30 disposed below and spaced apart from a second conveyor belt assembly 40. As best seen in FIG. 4, first conveyor belt assembly 30 has a frame 34 that has a side wall 36 extending along one of its sides and another side wall 38 extending along its other side. The side walls 36 and 38 carry a drive shaft 33A and an idler shaft 33B. A conveyor belt 31 extends around rollers 32A mounted on drive shaft 33A and around rollers 32B mounted on idler shaft 33B.

A lateral support 37 extends transversely across the bottom of frame 34. Lateral support 37 is affixed to the bottom of frame 34 and to a wall mount 24 that is affixed to frame wall 23. Lateral support 37 provides support for frame 34 as well as firmly attaching frame 34 to frame wall 23 via wall mount 24.

Frame wall 23 comprises a wall chamber that has a pair of separated side walls 23A and 23B (best seen in FIG. 2), a top frame wall 23C and a bottom frame wall 23D that together form the hollow wall chamber 23. Contained within chamber 23 is a drive train (not shown) for the drive shaft 33A. Drive shaft 33A extends into wall chamber 23 (see FIG. 4) and is driven by the drive train for rotation in the direction indicated by the arrow 35 in FIG. 3.

A heater shown as a platen 25 is situated internally of frame 34 with its heating surface adjacent to and extending substantially across conveyor belt 31 and along a distance L of the internal surface 31A of conveyor belt 31 intermediate the drive shaft 33A and the idler shaft 33B (see FIG. 4). Heat supplied by platen 25 is transferred by conveyor belt 31 from its internal surface 31A to its external surface 31B. The heating element 25 may alternatively be a different type of heater, for example, one that uses a hot circulating fluid such as oil or water, or radiant energy such as infrared, microwave and the like.

Second conveyor belt assembly 40 has a conveyor belt 41 with its external surface 41B facing external surface 31B of first conveyor belt assembly 30 to define a first cooking path 26 that extends along the distance L defined by platen 25. Second conveyor belt assembly 40 has another conveyor belt 51 with its external surface 51B facing external surface 31B of first conveyor belt assembly 30 to define a second cooking path 27 that extends along the distance L defined by platen 25.

Figure 5:
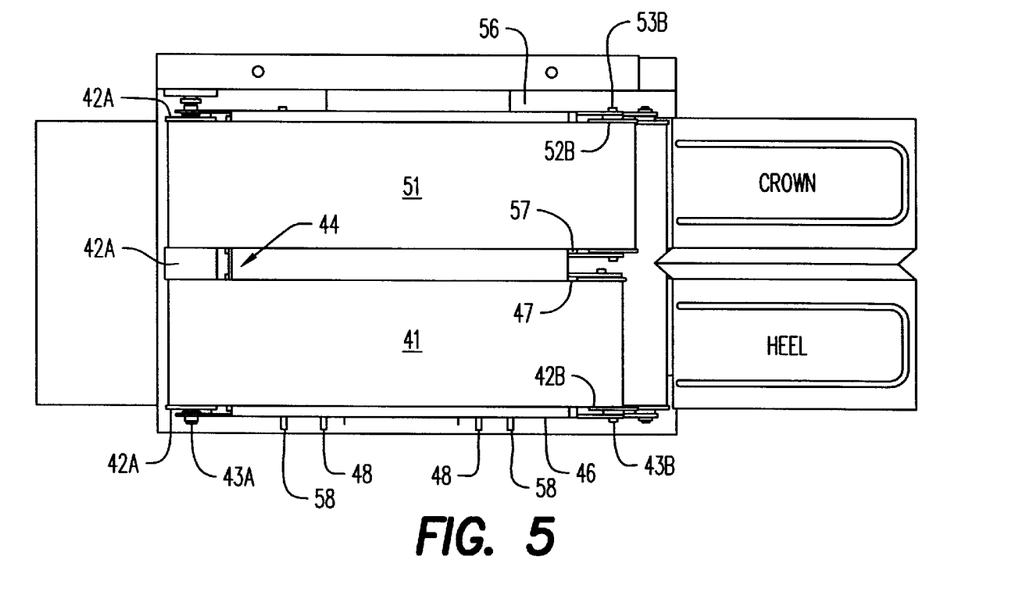
FIG. 5 is a top view of FIG. 1.

As best seen in FIG. 5, second conveyor belt assembly 40 has a frame 44 that carries a drive shaft 43A. Conveyor belts 41 and 51 extend over rollers 42A disposed on drive shaft 43A. Frame 44 also carries first and second idler shafts 43B and 53B that have rollers 42B and 52B, respectively. Conveyor belt 41 extends over rollers 42B and conveyor belt 51 extends over rollers 52B.

Frame 44 has a side wall 46 that extends along one of its sides and another side wall 56 that extends along its other side. Drive shaft 43A and idler shafts 43B and 53B are mounted at opposite ends of these side walls. Frame 44 also has shaft supports 47 and 57. Idler shaft 43B is supported by shaft support 47 and side wall 46, while idler shaft 54B is supported by shaft support 57 and side wall 56.

The drive train contained within side wall chamber 13 is also arranged to drive shaft 43A in the direction indicated by arrow 45 in FIG. 4. To this end, a drive element 60 is mounted on wall chamber 13. Drive element 60 has a rotatable drive quick connect/disconnect socket device 61. Device 61 has a female socket 62 that receives a mating male socket (not shown) on the end of drive shaft 43A. The square shape of female socket 62 shown in the drawings is exemplary and other suitable shapes may be employed. Also, socket 62 may be male and with a mating female socket on the end of shaft 43A.

A food product inlet 29 is arranged at one end of food cooking apparatus 20 to provide food products to be toasted to the cooking paths 26 and 27. Food product inlet 29 has a first inclined food tray 29A to feed bun heels to cooking path 26 and second inclined food tray 29B to feed bun crowns to cooking path 27. A food product outlet 21 is disposed at the other end of food cooking apparatus 20 to receive food products after cooking. Food product outlet 21 may be heated to keep the cooked food products warm.

Figure 1:
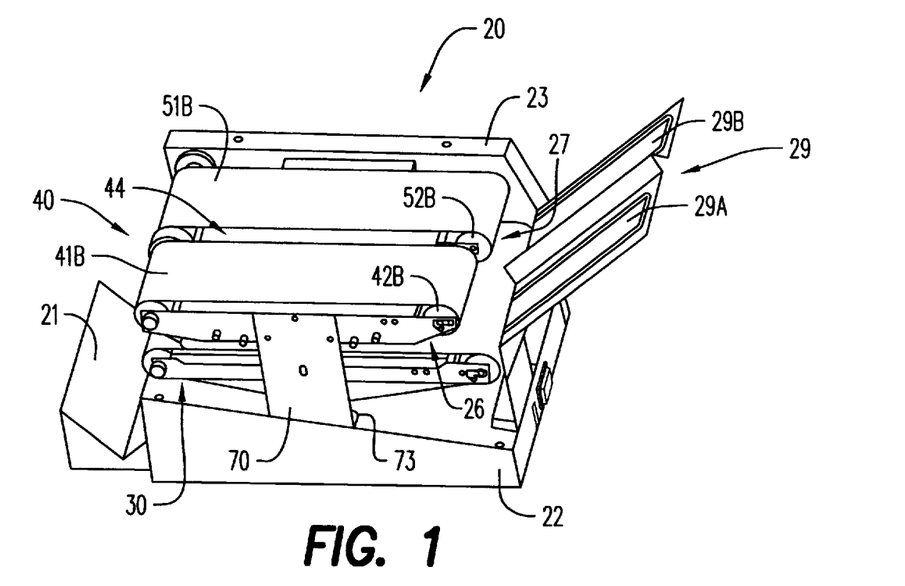
FIG. 1 is a perspective view of a food cooking apparatus with housing partially removed in accordance with the present invention.
Figure 2:
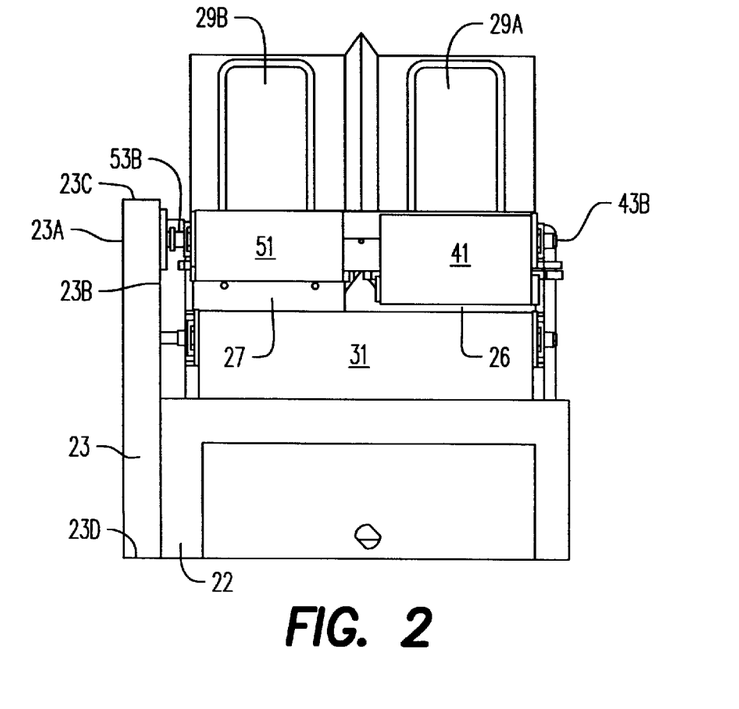
FIG. 2 is an end view in elevation of FIG. 1.

With reference to FIG. 2, cooking paths 26 and 27 have different heights or gaps between conveyor belt 31 and conveyor belts 41 and 51. This allows bun crowns and heels to be toasted simultaneously in cooking paths 26 and 27. Means is provided to separately adjust the separation gap heights for cooking paths 26 and 27. Thus, gap adjusters 58 (FIG. 5) serve to adjust the separation gap for cooking path 27 and gap adjusters 48 serve to adjust the separation gap for cooking path 26. The gap adjusters include a cam surface that permits selection of several different separation gap heights. Cams 49 are shown in FIG. 3 for gap adjusters 48.

Figure 3:
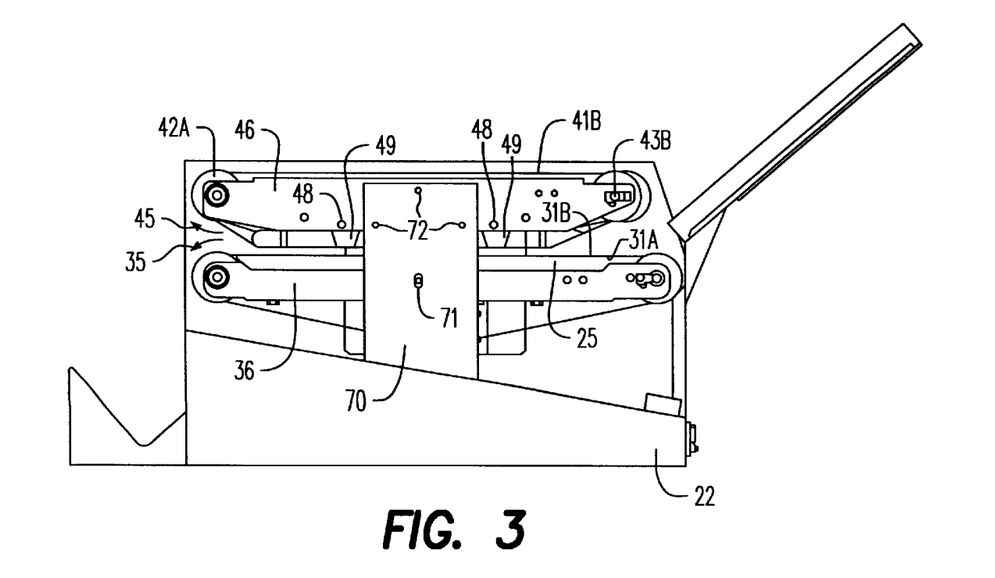
FIG. 3 is a side view in elevation of FIG. 1.

In operation, the drive train rotates drive shafts 33A and 43A to rotate conveyor belts 31 and 41 and 51 in the directions indicated by the arrows 35 and 45 in FIG. 3. As a food product, such as a bun heel, is presented from food tray 29A toward cooking path 26, oppositely rotating conveyor belts 31 and 41 grip the bun heel and move it toward and into and along cooking path 26 to product outlet 21. Since conveyor belt 31 is moving, the risk of roll or fold under of the bun heel is reduced. The entire cut surface of the bun heel will be flat on the external surface 31B of conveyor belt 31. Carmelization will then be uniform and complete as the bun proceeds along cooking path 26. The operation is substantially similar for bun crowns fed from food product tray 29B to cooking path 27.

The conveyor belts 31, 41 and 51 are endless belts that preferably are constructed of fiber glass and coated with a low friction material having good heat transfer properties. For example the coating material may suitably be polytetrafluoroethylene. The conveyor belt 31 is thin enough to provide the necessary heat transfer from platen 25 to the bun surface for carmelization. The conveyor belts 31, 41 and 51 preferably have permanent seams.

Food cooking apparatus 20 is characterized by ease and simplicity of assembly and accessibility of conveyor belt assemblies 30 and 40 for maintenance and cleaning. Thus, conveyor belt assemblies 30 and 40 are mounted to frame wall 23 by means of wall mount 24 and the couplings of drive shaft 33A and idler shaft 33B as described above. To provide further support, but allowing ready accessibility, a bracket 70 is provided.

Figures 6, 7:
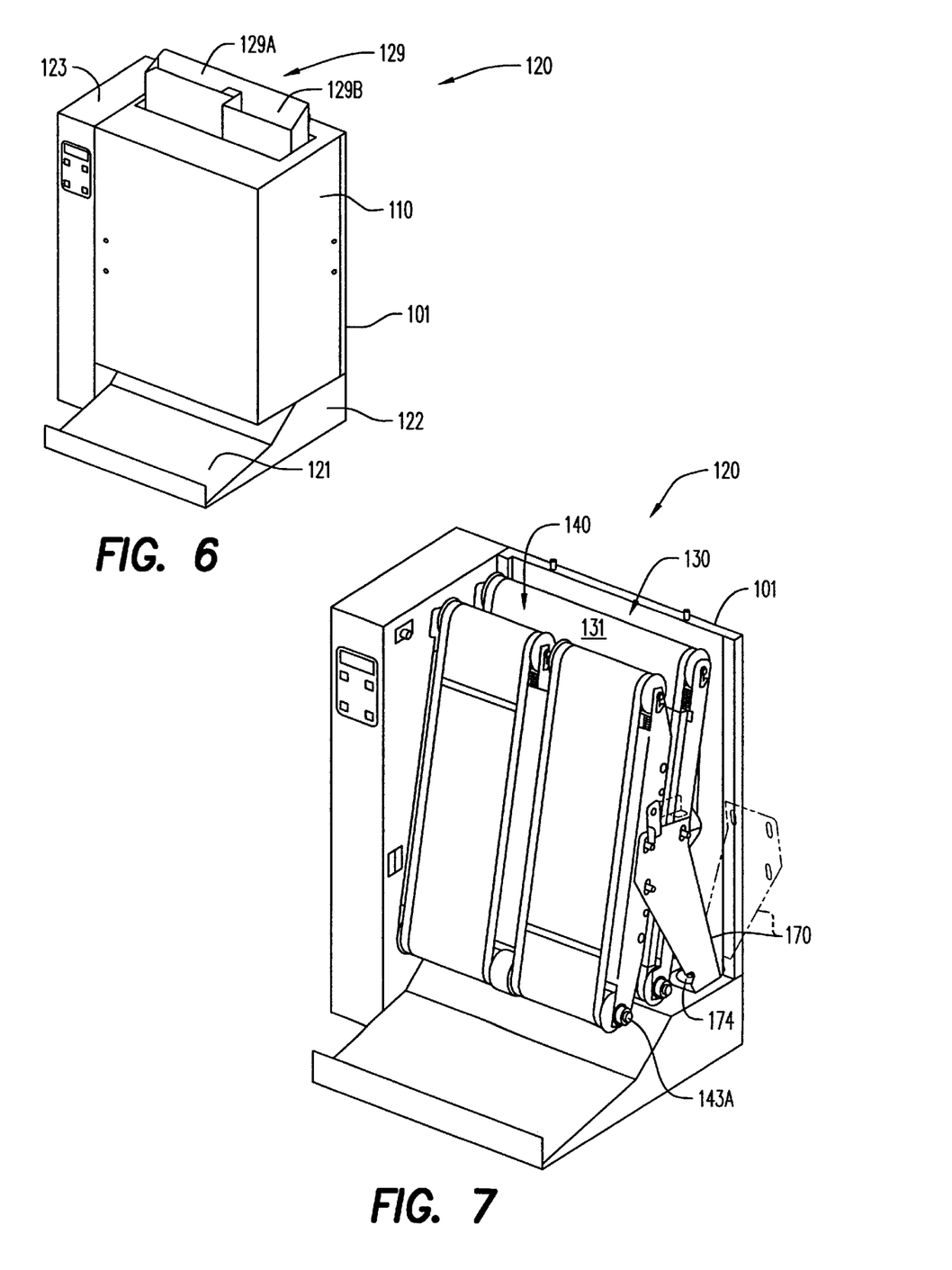
FIG. 6 is a perspective view of an alternative food cooking apparatus according to the present invention.
FIG. 7 is a perspective view of FIG. 6 with the housing removed.
Figure 8:
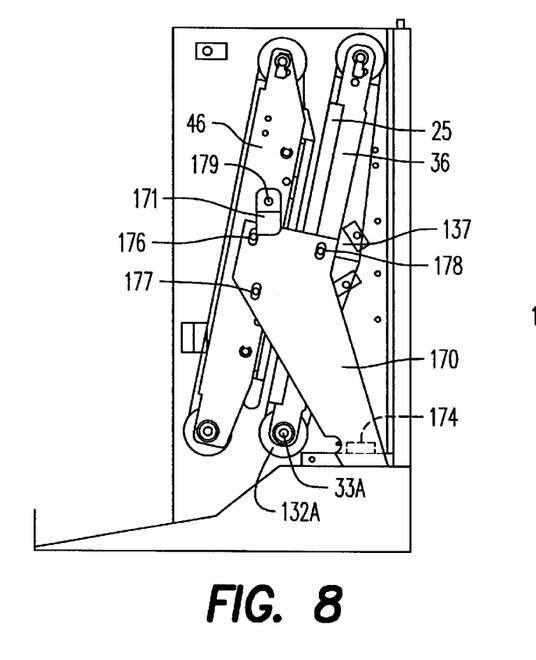
FIG. 8 is a side view in elevation of FIG. 7.

Referring to FIGS. 2 and 3, bracket member 70 is fastened to conveyor belt assembly 40 at 72 on side wall 46 by posts and apertures (shown in FIGS. 7 and 8) or by any suitable fastener such as screws or, weldments and the like. A releasable fastener 71 is used to fasten bracket member 70 to the first conveyor belt assembly 30 at side wall 36. Fastener 71 may be any suitable fastener that is easily releasable by the user of the food cooking apparatus 20. For example, fastener 71 may suitably be a thumb screw. The lower extremity 73 of bracket member 70 is shaped to sit on base 22 to provide additional support for both conveyor belt assemblies 30 and 40.

Thus, food cooking apparatus 20 is quick to assemble in manufacture and yet provides ready access to the conveyor belt assemblies for maintenance and cleaning. To provide access, the bracket 70 is released by undoing thumb screw 71 and moved away from assemblies 30 and 40. This permits rapid access.

The entire conveyor belt assembly 40 with conveyor belts 42 and 51 is removable on a quick connect/disconnect basis. This is achieved by means of a bracket member 70 that, when released, allows the entire conveyor assembly 40 to slide out of its support connections to base 22 and frame wall 23.

Conveyor belt assembly 40 is slidably removable from wall chamber 13 once bracket member 70 has been released or uncoupled. Conveyor assembly 40 is releasably joined to wall chamber via drive element 60 and socket device 61. As described above, the end of drive shaft 43A is shaped to mate with female socket 62 of socket device 61 so as to slide in and out of engagement in a quick connect/disconnect manner. Conveyor assembly 40 is also coupled to frame wall 23 at wall mount 24 by means of rods 28 that project outwardly from wall mount 13. Rods 28 slidably engage mating holes (not shown) in side wall 56 of frame 44.

The conveyor belts 31, 41 and 51 of food cooking apparatus 20 are easily and quickly removable for cleaning, maintenance or replacement as will be described below in connection with FIG. 11.

The food cooking apparatus 20 shown in FIGS. 1 through 5 is a horizontal cooker inasmuch as the cooking paths 26 and 27 are substantially horizontal. An alternative embodiment is shown as food cooking apparatus 120 in FIGS. 6 through 9. Food cooking apparatus 120 is a vertical cooker inasmuch as the cooking paths, though inclined slightly, are substantially vertical. Parts of food cooking apparatus 120 that are substantially identical to parts of food cooking apparatus 20 are identified by the same reference characters.

With reference to FIGS. 6 through 9, food cooking apparatus 120 has a base 122, a frame wall 101, a frame wall 123, a housing enclosure 110, a food product inlet 129, a food product outlet 121, conveyor belt assemblies 130 and 140 and a bracket member 170. Food product inlet 129 has a bun heel inlet 129A and a bun crown inlet 129B. Frame walls 101 and 123 are perpendicular to one another and extend from base 122 in the vertical direction.

Conveyor belt assembly 130 is very similar to conveyor belt assembly 30 of FIGS. 1 through 5. Conveyor belt assembly 130 differs in that its physical orientation is inclined slightly to the vertical, but is substantially vertical to receive the bun heels and crowns inserted into bun heel inlet 129A and bun crown inlet 129B. Conveyor belt assembly 130 differs slightly in the construction of a lateral support 137. Conveyor belt assembly 130 differs in the manner of its specific coupling to bracket member 170.

Conveyor belt assembly 140 is very similar to conveyor belt assembly 40 of FIGS. 1 through 5. Conveyor belt assembly 140 differs in that its physical orientation is inclined slightly to the vertical, but is substantially vertical to receive the bun heels and crowns inserted into bun heel inlet 129A and bun crown inlet 129B. Conveyor belt assembly 140 differs in the manner of its specific coupling to bracket member 170. Conveyor belt assembly 140 has a drive shaft 143A that is directly coupled to the drive train that resides in frame wall 123. That is, conveyor belt assembly 140 is not removable on a quick connect/disconnect basis.

In manufacture, conveyor belt assemblies 130 and 140 are firmly secured to frame wall 123 by means of fasteners not shown as well as by secure couplings of drive shaft 33A, drive shaft 143A and lateral support 137. Side walls 36 and 46 of conveyor belt assemblies 130 and 140 are releasably fastened to bracket member 170.

Bracket member 170 is pivotally mounted to base 122 at pivot 174. Bracket member 170 includes three apertures 175 that mate with a first, second and third post 176, 177 and 178. Posts 176 and 177 protrude outwardly from side wall 46 of conveyor belt assembly 140 and post 178 protrudes outwardly from side wall 36 of conveyor belt assembly 130. A releasable fastener or latch 171 is mounted on side wall 46 at pivot 179. In the solid line position shown in FIG. 7, latch 171 retains or keeps bracket member 170 firmly in place to provide support to conveyor belt assemblies 130 and 140. To release bracket member 170 from the supporting position, latch 171 is turned counterclockwise about pivot 179 to the dashed line position (FIG. 7) until it is free of bracket member 170. Bracket member 170 is then moved to the dashed line position (FIG. 7) away from conveyor belt assemblies 130 and 140 by pivoting about pivot 174 to provide access for maintenance and/or cleaning.

Figure 9:
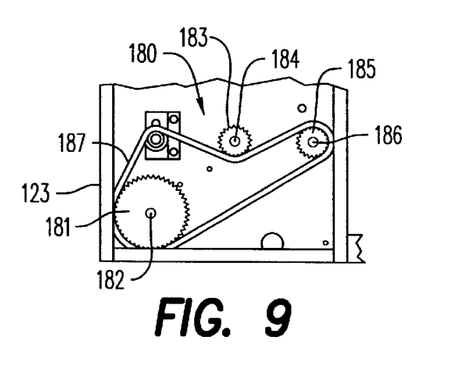
FIG. 9 is an elevational view of a drive train for the food cooking apparatus of FIG. 8.

Frame wall 123 comprises a wall chamber that contains a drive train 180. Drive train 180 contains a sprocket 181 having a shaft 182 that is driven by a motor (not shown). Sprocket 181 is arranged to drive a sprocket 183 and a sprocket 185 via a chain 187. Sprocket 183 has a shaft 184 that is firmly coupled to drive shaft 33A of conveyor belt assembly 130. Sprocket 185 has a shaft 186 that is firmly coupled to drive shaft 143A of conveyor belt assembly 140. When sprocket 181 is driven in the clockwise direction, sprockets 183 and 185 rotate in clockwise and counterclockwise directions, respectively. This produces clockwise and counterclockwise rotation of drive shafts 33A and 143A, respectively.

Platen 25 mounted in conveyor belt assembly 30 (FIGS. 3, 4 and 8) is configured to cook a food product with high heat and temperature in the early stages of its travel along cooking paths 26 or 27 and with lower heat and temperature in the later part of its travel. This is desirable to quickly heat a cold food product by rapidly bring it to a desired cooking temperature. The heat produced by platen 25 is then reduced to avoid over cooking as the food product continues to travel along the cooking path.

Figure 10:
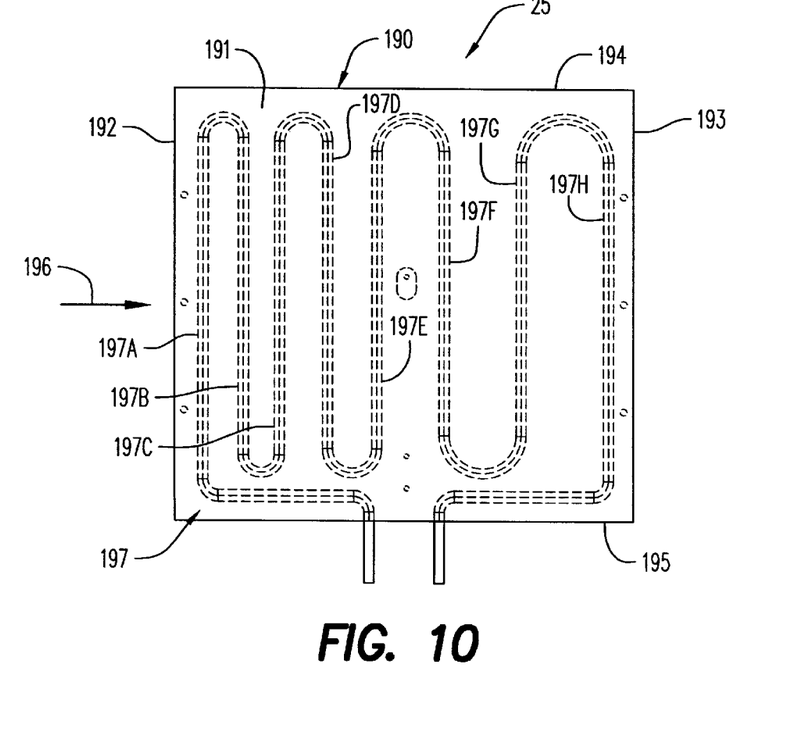
FIG. 10 is a top view of an electrical heater in accordance with the invention.

FIG. 10 shows platen 25 configured for variable temperature cooking in accordance with the present invention. Platen 25 includes a body 190 that has a heating surface 191. Heating surface 191 has edges 192, 193, 194 and 195. Edges 194 and 195 are parallel to the cooking paths 26 and 27. Edges 192 and 193 are transverse to the cooking paths 26 and 27. Edge 192 is the leading edge and edge 193 is the trailing edge with respect to the direction of food product travel indicated by arrow 196.

An electrical heating coil 197 is wound in a serpentine manner in a plane that is coplanar with and in heating relation to heating surface 191. Heating coil 197 is preferably disposed within the platen body 190. Heating coil 197 has a plurality of coil segments 197A through 197H that are parallel to edges 192 and 193 and transverse to the direction of food product travel. Heating coil terminates at its in electrical terminals 198 and 199 that are connectable to temperature control means (not shown) for the receipt of electrical energy.

Coil segments 197A through 197H are spatially distributed to produce heat of higher temperature from heating surface 191 near leading edge 192 and of lower temperature near trailing edge 193. To this end, the distances between adjacent one of coil segments 197A through 197H progressively increase from the leading edge 192 to the trailing edge 193. When supplied with electrical energy, coil 197 produces heat in heating surface 191 that varies from high temperature near leading edge 192 to low temperature at trailing edge 193.

Conveyor belt assemblies 30, 40, 130 and 140 are each provided with a quick install/remove feature for their respective endless belts in accordance with the present invention. This feature allows the use of permanent seam belts instead of spliced seam belts used in the prior art.

Figure 11:
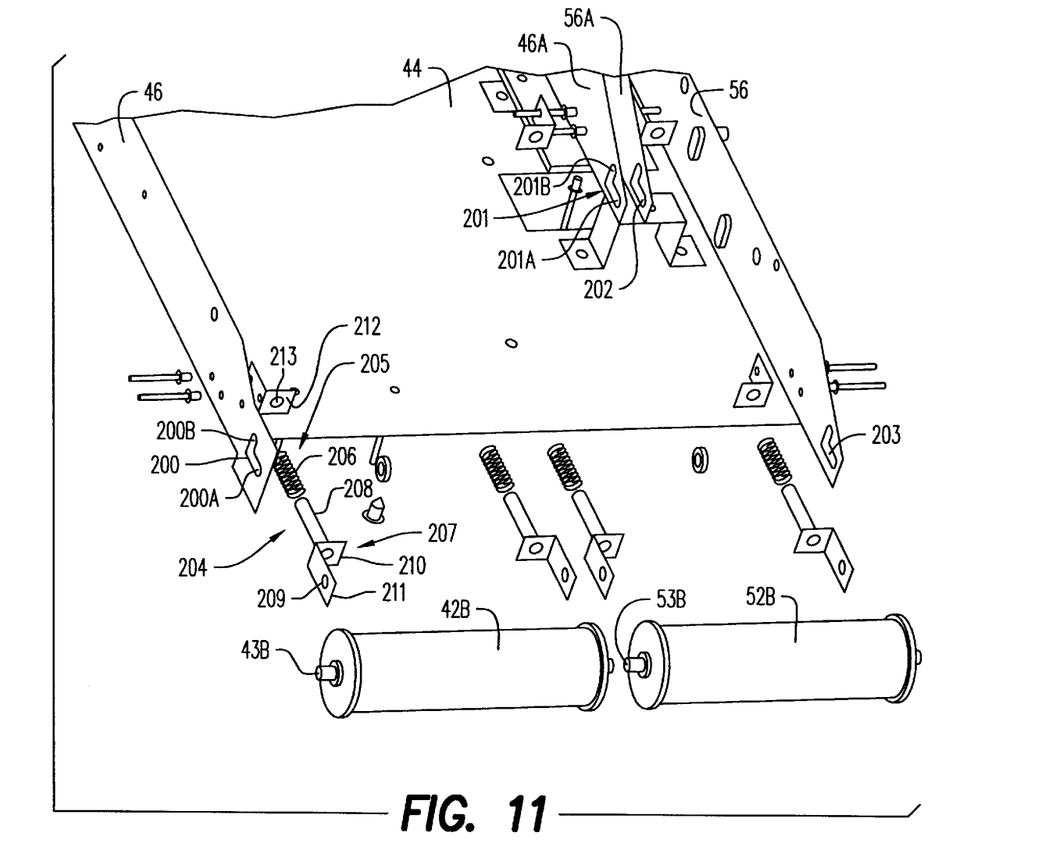
FIG. 11 is an exploded view in perspective of the conveyor belt assembly for the food cooking apparatus of FIGS. 1 through 5 and 6 through 9.

Referring to FIG. 11, idler shafts 33B, 43B and 53B are each spring biased whereby by manually pushing the associated idler roller toward the frame 34 or 44, as the case may be, the associated conveyor belt may be removed. The spring bias arrangement in each case is similar. By way of example, FIG. 11 shows a quick install/remove feature according to the present invention for conveyor belt assembly 40. It is understood that conveyor belt assemblies 30, 130 and 140 preferably include the quick install/remove feature.

Referring to FIG. 11, a first internal wall member 46A and a second internal wall member 56A are located on frame 44 in alignment with side walls 46 and 56. A first slot 200 is located in side wall 46 and a second slot 201 is located in internal wall member 46A. Idler shaft 43B is disposed in slots 200 and 201. A third slot 203 is located in side wall 56 and a fourth slot 202 is located in internal wall member 56A. Idler shaft 53B is disposed in slot 202 and 203.

Figure 11A:
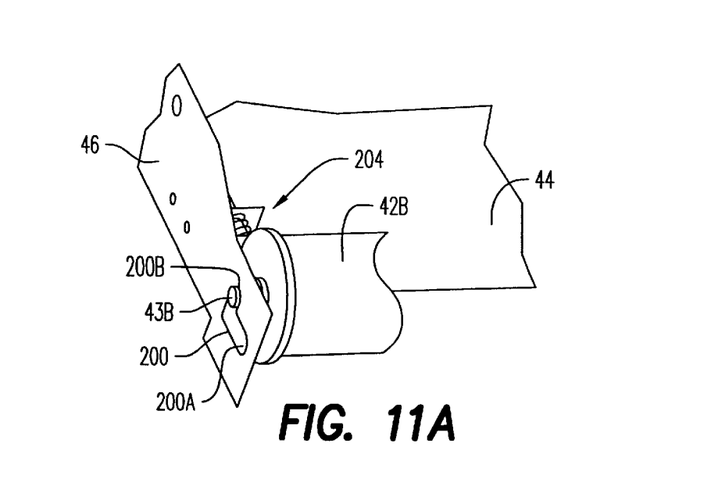
FIG. 11A is a partial view of the guide roller assembly of conveyor belt assembly of FIGS. 1 through 5, 6 through 9 and 11.

Referring to FIGS. 11 and 11A, idler shaft 43B can reside in a first retaining position 200A and 201A in slots 200 and 201. Idler shaft 43B can also reside in a second retaining position 200B and 201B in slots 200 and 201. Retaining position 200A/201A corresponds to a first position of conveyor belt assembly 40 in FIGS. 1 through 5 in which endless belt 41 engages idler roller 43B and drive roller 42A and in which driving motion is transmitted to belt 41 from drive roller 42A. Retaining position 200B/201B corresponds to a second position of conveyor belt assembly 40 in which endless belt 41 is easily installed or removed.

An idler shift means 204 is operable to shift idler shaft 43B between retaining positions 200A/201A and 200B/201B. As idler shift means 204 includes identical parts for each end of idler shaft 43B, only those parts for that cooperate with or are attached to side wall 46 will be described in detail.

Idler shift means 204 includes a spring bias means 205 and a receiver 212. Spring bias means 205 includes a spring 206 and a slide 207. Slide 207 has a first leg 210 from which a rod 208 extends through spring 206 into a hole 213 in receiver 212. Receiver 212 is secured to side wall 46. Slide 207 has a second leg 211 that contains a hole 209 in which idler shaft 43B resides.

To shift the idler shaft from retaining position 200A/201A to retaining position 200B/201B, idler roller 42B is manually pushed to overcome the force of spring 206 to the bend of slots 200 and 201 and then upward to retaining position 200B/201B. When in this position, spring 206 is maintained in compression between slide leg 210 and receiver 212 and idler shaft 43B is retained by this compressive force and prevented from moving without manual force. To shift idler shaft 43B back to retaining position 200A/201A, shaft 43B is manually pushed down from position 200B/201B to the bend of the L-shape. At this point, spring 206 forces return of shaft 43B to retaining position 200A/210A.

The present invention having been thus described with particular reference to the preferred forms thereof, it will be obvious that various changes and modifications may be made therein without departing from the spirit and scope of the present invention as defined in the appended claims.

What is claimed is:

1. A bread toasting apparatus comprising:
    a frame;
    a first conveyor belt assembly having a first endless belt and a second conveyor belt assembly having a second endless belt and a third endless belt, said first and second conveyor belt assemblies being mounted to said frame so as to be disposed opposite one another, wherein said second and third endless belts are spaced from said first endless belt, thereby defining a first toasting path having a first gap and a second toasting path having a second gap;
    means for moving said first, second and third endless belts to convey bread products along said first and second toasting paths from a bread product inlet to a bread product outlet, wherein said second and third endless belts are independently adjustable to vary said first and second gaps.

2. The bread toasting apparatus of claim 1, wherein said second conveyor assembly includes first and second gap adjusting means for adjusting said first and second gaps, respectively, in a range of different heights.

3. The bread toasting apparatus of claim 2, wherein said first and second gap adjusting means include first and second independently adjustable cams, respectively.

4. The bread toasting apparatus of claim 1, further comprising:
    electrical heating means for heating said bread products with a toasting temperature that decreases along said first and second toasting paths, said electrical heating means including a platen that includes:
        a body having a heating surface defined by first and second generally parallel edges that are generally perpendicular to said first and second toasting paths;
        an electrical heater element having a continuous heater coil wound in a serpentine manner and disposed in heating relationship to said heating surface, said coil being substantially coplanar with said heating surface, said coil being spatially distributed in a manner whereby, when connected to electrical energy, the temperature of said heating surface is higher near said first edge and lower near said second edge.

5. A bread toasting apparatus according to claim 4 wherein said coil has a plurality of turns and a plurality of coil segments extending between said turns in a direction generally parallel to said first and second edges of said heating surface, and the spacing between adjacent ones of said coil segments being smaller near said first edge and larger near said second edge so that said toasting temperature is higher in the region of the toasting path near the food product inlet end and lower at the bread product outlet end of said toasting path.

6. A bread toasting apparatus according to claim 5 wherein said spacing progressively increases from said first edge to said second edge.

7. A bread toasting apparatus according to claim 1, wherein said platen is disposed opposite said surface of the first endless belt of said first conveyor assembly.

8. A food cooking apparatus comprising:
    a frame;
    a conveyor belt assembly mounted to said frame, said conveyor belt assembly including first and second wall members with first and second slots, respectively, a drive roller, an idler roller with a shaft disposed in the first and second slots, an endless belt, an idler shift, and means for biassing said shaft in a first position in the first and second slots in which said endless belt engages said drive roller and said idler roller and driving motion is adapted to be transmitted from said drive roller to said endless belt, said idler shift means being operable to manually shift the shaft to a second position in the first and second slots in which said endless belt is easily installed or removed from said assembly, wherein the first and second slots are shaped so that when the idler shaft is in the second position, the means for biassing is inoperable to shift the idler shaft to the first position; and
    means for driving said drive roller to move said endless belt to convey food products along a cooking path from a food product inlet to a food product outlet.

9. A food cooking apparatus according to claim 8 wherein said slot is L-shaped and said first and second retaining positions are at the distal ends thereof.

10. A food cooking apparatus according to claim 9 wherein said idler shift means includes:
    receiver means; and
    slide means operable with said spring means and said receiver means for shifting said idler roller between said first and second conveyor belt positions.

11. A food cooking apparatus according to claim 10 wherein said slide means includes an L-shaped angle means having a bore in one leg thereof to hold said idler shaft and a post extending from the other leg thereof, said spring means being disposed on said post and said post being slidable in said receiving means as said idler roller is shifted between said first and second conveyor belt positions.

12. A food cooking apparatus comprising:
    a base;
    a frame wall extending from said base;

a conveyor belt assembly having first and second side walls;

means for attaching said first side wall of said conveyor belt assembly to said frame wall; and a support bracket disposed between said base and said second side wall of said conveyor belt assembly, said support bracket being releasably coupled to said second side wall.

13. A food cooking apparatus according to claim 12 wherein said support bracket is fastened to said second side wall by a releasable fastener.

14. A food cooking apparatus according to claim 13 wherein said support bracket when released by said releasable fastener is movable away from said second side wall of said conveyor belt assembly.

15. A food cooking apparatus according to claim 14 wherein said support bracket when released by said releasable fastener is removable from said second side wall and said base.

16. A food cooking apparatus according to claim 14 wherein said support bracket is pivotally mounted to said base, said support bracket when released by said releasable fastener pivots away from said second side wall of said conveyor belt assembly.

* * * * *